US009978200B2

(12) United States Patent
Ventura

(10) Patent No.: US 9,978,200 B2
(45) Date of Patent: May 22, 2018

(54) METHOD AND DEVICE FOR CONDUCTING A CARD GAME

(71) Applicant: AGS, LLC, Las Vegas, NV (US)

(72) Inventor: Ofir Ventura, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 0 days. days.

(21) Appl. No.: 13/633,371

(22) Filed: Oct. 2, 2012

(65) Prior Publication Data

US 2014/0094236 A1 Apr. 3, 2014

(51) Int. Cl.

*A63F 9/24* (2006.01)
*A63F 13/00* (2014.01)
*G06F 17/00* (2006.01)
*G06F 19/00* (2018.01)
*G07F 17/32* (2006.01)

(52) U.S. Cl.

CPC .......... *G07F 17/32* (2013.01); *G07F 17/3293* (2013.01)

(58) Field of Classification Search

CPC ......................... G07F 17/3293; G07F 17/3262
USPC .................................................. 273/274, 292
See application file for complete search history.

(56) References Cited

U.S. PATENT DOCUMENTS 5,362,064 A * 11/1994 Lofink et al. ................. 273/292
6,135,454 A * 10/2000 Mostashari ............... A63F 1/00 273/292
6,302,396 B1 * 10/2001 Eaton ........................ A63F 1/00 273/274
2002/0155872 A1 * 10/2002 Odom et al. .................... 463/13
2008/0122177 A1 * 5/2008 Kling .................. A63F 3/00157 273/292
2010/0090402 A1 * 4/2010 Katz ....................... G07F 17/32 273/292

OTHER PUBLICATIONS

Runnin Baccarat Rules, Mar. 11, 2009 (Mar. 11, 2009), <http://web.archive.org/web/20090311052730/http://www.ml388.com/rules/runningBaccaratRules_en.asp>.*

* cited by examiner

*Primary Examiner* — Milap Shah
*Assistant Examiner* — Jason Pinheiro
(74) *Attorney, Agent, or Firm* — Weide & Miller, Ltd.

(57) ABSTRACT

Game wagers are received without designating the hand used to resolve the game wager. At least two hands are dealt. A portion of the playing cards among those dealt to the hands are exposed. The exposed playing cards may come entirely from one hand or may come from multiple hands. After exposing a portion of the cards, a designation wager is received along with a designation of one of the hands for resolution of the designation wager and game wager. Hands are completed according to the rules of baccarat or a baccarat variation. After the hands are completed, a determination is made whether the designated hand is a winning hand and wagers are resolved. Optionally, designation wagers are paid and game wagers are returned when the designated hand is a winning hand.

12 Claims, 3 Drawing Sheets

METHOD AND DEVICE FOR CONDUCTING A CARD GAME

FIELD OF THE INVENTION

The present invention relates to wagering games. More specifically, the present invention is a method for conducting a card game in which players place a wager and designate the hand used to resolve the wager after at least a portion of a hand and/or a competing hand is revealed.

BACKGROUND OF THE INVENTION

A well known casino game is Baccarat. Baccarat is a live table game that uses a standard deck of fifty-two playing cards. The object of Baccarat is for a player to successfully wager on which of two hands, designated the Banker hand and the Player hand, is going to win. The player is paid even money for the wager if he or she wagers on the winning hand and loses the wager if he or she selects the losing hand.

Play of Baccarat is commenced after all wagers are made by dealing two cards to the Bank position and two cards are dealt from the shoe to the Player position on the table layout. The cards are turned face up and the values of the Banker hand and the Player hand is determined by summing the face values of the cards in each hand. If the values of the cards are added together and the total of the hand exceeds nine, then the hand value is determined modulo ten. In other words, all hand values range from a low of zero to a high of nine. For example, a seven and an eight total fifteen, but the hand value is five. An Ace and a nine total ten, but the hand value is zero. Whichever of the Banker hand or the Player hand is closest to a total of nine is the winner.

Depending on the hand score of the initial Player hand and the initial Banker hand, one more card may be dealt to the Player hand, the Banker hand or both. If either or both of the initial two card Player hand and the initial Banker hand have a hand score of 8 or 9, the wagers are resolved without dealing any additional cards: the Player hand wins if the Player hand score is greater than the Banker hand score; and the Banker hand wins if the Banker hand score is greater than the Player hand score. If both the Player hand and Banker hand have a hand score that is less than 8, a third card may be dealt to one or both of the Player hand and/or Banker hand. The rules for determining whether a third card is dealt are fixed; that is, there is no discretion for either the Player hand or the Banker hand on whether a third card is dealt.

Rule #1: If the initial two card Player hand has a hand score of 0, 1, 2, 3, 4, or 5, the Player hand draws a third card. If the initial two card Player hand has a hand score of 6 or 7, the Player hand stands and does not receive a third card.

Rule #2: If the Player hand stands and does not draw a third card, then the Banker hand follows Rule #1. In other words, if the Player hand has a hand score of 6 or 7, the Banker hand draws a third card on a hand score of 0, 1, 2, 3, 4, or 5 and the Banker hand stands on a hand score of 6 or 7.

Rule #3: If the Player hand draws a third card, the Banker hand must draw or stand as follows:

| Banker hand two card hand score: | Banker hand DRAWS when Player's hand third card is: | Banker hand STANDS when Player's hand third card is: |
|---|---|---|
| 0, 1, or 2 | Bank always draws | |
| 3 | 0, 1, 2, 3, 4, 5, 6, 7, or 9 | 8 |

-continued

| Banker hand two card hand score: | Banker hand DRAWS when Player's hand third card is: | Banker hand STANDS when Player's hand third card is: |
|---|---|---|
| 4 | 2, 3, 4, 5, 6, or 7 | 0, 1, 8, or 9 |
| 5 | 4, 5, 6, or 7 | 0, 1, 2, 3, 8, or 9 |
| 6 | 6 or 7 | 0, 1, 2, 3, 4, 5, 8, or 9 |
| 7 | | Banker always stands |

At the end of each hand, winning wagers are paid and losing wagers are collected by the house. Any commission due to the house is marked in commission boxes in the center of the table.

SUMMARY OF THE INVENTION

The present invention includes a method of conducting a card game at a physical gaming table using playing cards for at least one player. A set of draw rules is defined. Optionally, the draw rules are based on conventional baccarat. Alternatively, the draw rules may be a variation on baccarat, including any of the known no-commission baccarat variations.

In one optional embodiment, a game wager is received prior to dealing and/or revealing any hands. In an alternate optional embodiment, a game wager is not received. In an optional embodiment including a game wager, the game wager is received without a designation of any hand for resolution of the game wager. That is, the game wager is not affiliated or committed to either the player hand or banker hand for resolution. Rather, the game wager merely allows a player to be eligible to participate in the game.

A banker hand and a player hand of playing cards are dealt. At least a portion of the playing cards among the playing cards dealt to the banker hand and the player hand are revealed. In one optional embodiment, a portion, or all, of the player hand is revealed. In alternate optional embodiments, a portion, or all of the banker hand may be revealed. In yet another optional embodiment, a portion of the player hand and a portion of the banker hand may be revealed.

A mandatory designation wager is received after at least a portion of the playing cards dealt to the banker hand and the player hand have been revealed. In an optional embodiment in which a game wager was received, the mandatory designation wager may constitute a second game wager. Along with the mandatory designation wager, a designation is received of either the player hand or the banker hand for resolution of the mandatory designation wager. That is, the designation of either the player hand or banker hand is received after at least a portion of the playing cards among the playing cards dealt to the banker hand and the player hand have been revealed.

The player hand and banker hand are completed according to the base game, e.g., a baccarat game or baccarat-type game. For example, in an optional embodiment, a hand score is calculated for each of the banker hand and the player hand as the sum modulo ten of the values of the playing cards in that hand. The hand scores of the banker hand and the player hand are compared to a target value. The draw rules determine whether additional playing cards are dealt to the banker hand and the player hand or the banker hand and/or player hand stand. The hand score of the player hand is compared to the hand score of the banker hand and the target value.

Mandatory designation wagers on the hand having a hand score closer to the target value are rewarded. Optionally, mandatory designation wagers on the hand having a hand score further from the target value are collected. In an optional embodiment, mandatory designation wagers may also be collected when the hand scores of the player hand and banker hand are equal or tied.

In an optional embodiment having a game wager and a mandatory designation wager, the mandatory designation wagers on the hand having a hand score closer to the target value are rewarded. In an optional embodiment including a game wager, game wagers on the hand having a hand score closer to the target value may be rewarded or returned.

In an optional embodiment, a method according to the present invention may be conducted on a gaming device with a data processor in communication with a display, a player interface, and a memory device. In an optional embodiment, the memory device is configured to store program instructions. The memory device may also store a set of draw rules at the memory device.

A game wager may be received through the player interface without receiving a designation of whether the game wager is to be resolved based on a banker hand or a player hand. After a game wager is received, the banker hand and the player hand of playing cards are dealt by the data processor. At least a portion of the playing cards among the playing cards dealt to the banker hand and the player hand are displayed at the display. As above, the playing cards displayed could be: (a) a portion or all of the cards dealt to the player hand; (b) a portion or all of the cards dealt to the banker hand; (c) a portion of the cards dealt to the banker hand and a portion of the cards dealt to the player hand; or (d) a combination thereof.

After displaying at least a portion of the playing cards among the playing cards dealt to the banker hand and the player hand, a mandatory designation wager is received through the player interface. A designation of either the player hand or the banker hand for resolution of the game wager and the mandatory designation wager is also received through the player interface after displaying at least a portion of the playing cards among the playing cards dealt to the banker hand and the player hand.

The player hand and banker hand are completed based on the base game of baccarat or a baccarat-type game. For example, in one optional embodiment, the data processor calculates a hand score for each of the banker hand and the player hand as the sum modulo ten of the values of the playing cards in that hand. The data processor compares the hand scores of the banker hand and the player hand to a target value and determines whether to stand or deal additional playing cards to the banker hand and the player hand according to the draw rules. The data processor compares the hand score of the player hand to the hand score of the banker hand and the target value and rewards mandatory designation wagers on the hand having a hand score closer to the target value. In an optional embodiment, the data processor rewards game wagers on the hand having a hand score closer to the target value. Alternatively, the data processor returns game wagers on the hand having a hand score closer to the target value. Optionally, the data processor collects the game wagers and mandatory designation wagers on the hand having a hand score further from the target value. In a further optional embodiment, the data processor may collect the game wagers and mandatory designation wagers when the hand scores of the player hand and banker hand are equal.

DESCRIPTION

Figure 1:
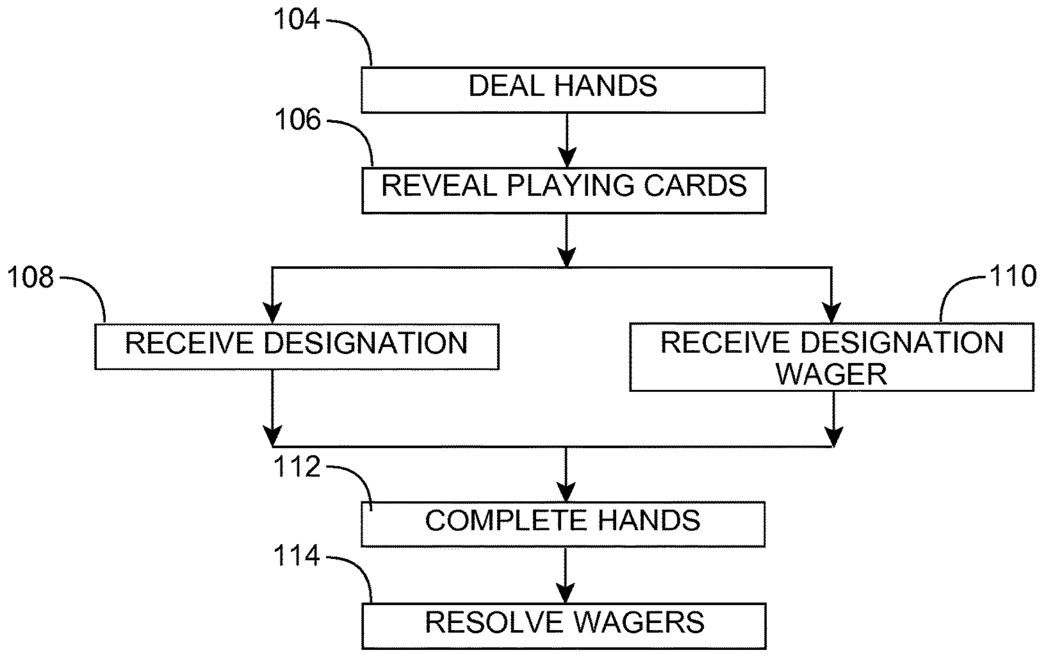
FIG. 1 is a flowchart of a method according to an embodiment of the present invention.
Figure 2:
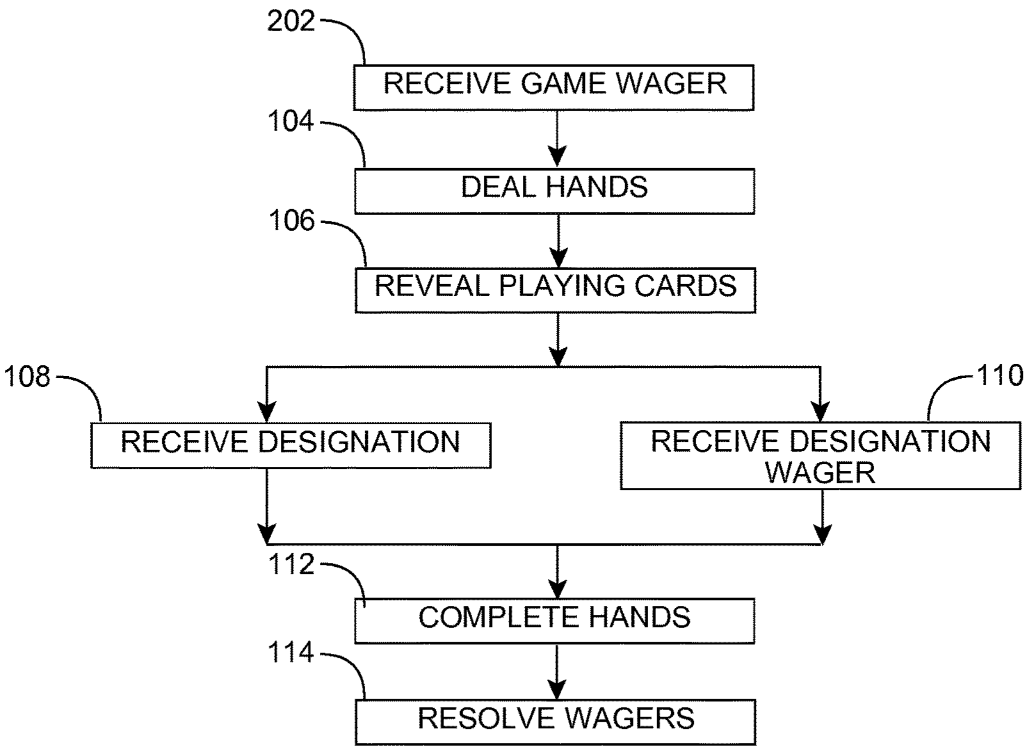
FIG. 2 is a flowchart of a method according to an embodiment of the present invention.
Figure 3:
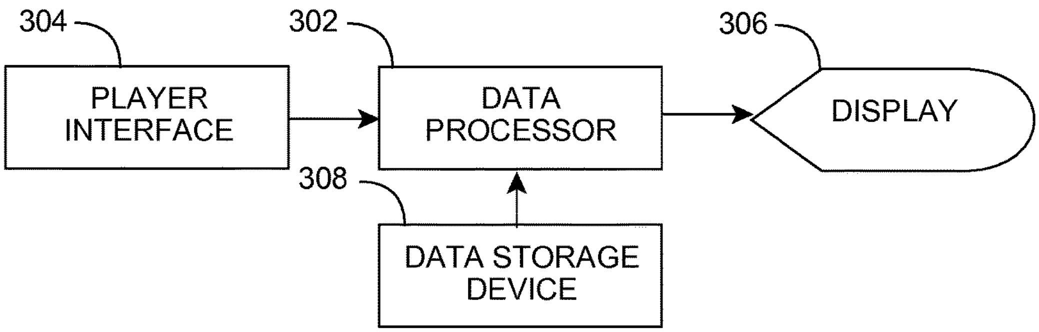
FIG. 3 is a block diagram of a device according to an embodiment of the present invention.

Reference is now made to the figures wherein like parts are referred to by like numerals throughout. Referring generally to FIGS. 1-3, the present invention is directed to a method for conducting a wagering game, particularly a card game. In this regard, a method according to the present invention could be conducted using conventional playing cards, that is, playing cards having a rank of two through ten, Jack, Queen, King, or Ace in four different suits, or customized playing cards. Similarly, the present game could be conducted using one or more decks of conventional fifty-two card constitution, one or more supplemented decks (for example, decks including additional playing cards such as Jokers), one or more truncated decks (for example, Spanish decks lacking playing cards typically found in conventional decks), or the like. Moreover, the present invention may be conducting using a device. A device may take any form, including a personal computer (whether networked or standalone), tablet device, mobile phone, PDA, interactive television, video gaming machine, mechanical gaming machine, kiosk, or the like. In an optional embodiment illustrated in FIG. 3, the device includes a data processor 302 in communication with a display 304, a data storage device 306, and a player interface 308. The data storage device 306 may take any form, including magnetic, optical, Flash, or other memory, and is configured to store graphics, sounds, parameters for conducting the game method, and the like. The data storage device 306 also stores program instructions executable by the data processor 302 to conduct a game according to an embodiment of the present invention.

Referring to FIGS. 1 and 2, the present method includes a game conducted for one or more players. A game according to the present invention could be house-banked, i.e., the wagers are collected and paid by a game operator, or player-banked, i.e., the wagers are collected and paid by a player-banker. In an optional embodiment in which the game is player-banked, the role of player-banker may be fixed or rotate among players.

In an optional embodiment, the method may be applied to a conventional baccarat game. Alternatively, the present method may be applied to variations on baccarat, or baccarat-type games, such as the various no-commission baccarat games or the like.

FIGS. 1 and 2 illustrate two optional embodiments of a game method according to the present invention. In the optional embodiment of FIG. 1, no wager is received before dealing hands. In the optional embodiment of FIG. 1, a wager is not required until after hands have been dealt, and at least a portion of the playing cards among those dealt to the hands have been revealed. In the optional embodiment of FIG. 2, a game wager, which may be called an ante wager, is received prior to revealing any cards. In the optional embodiment of FIG. 2, a game wager may be received prior to dealing any hands, although this is not required according to the present invention.

Figure 4:
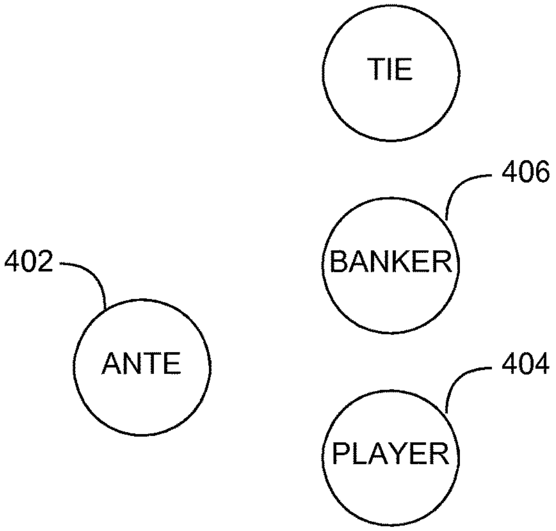
FIG. 4 is a top view of a player area of a table layout according to an embodiment of the present invention.

Turning first to FIG. 2, a game wager is received 202. The game wager, which may be identified as an ante wager, is not affiliated with, or committed to, any hand for resolution. That is, the game wager is unaffiliated as to either hand for resolution. Put another way, the game wager is not wagered on either hand, but is required for the player to be eligible for participation in the game. In this regard, the game wager may be viewed as a mandatory eligibility wager. FIG. 4 illustrates a player area for a table layout that may be used in an optional embodiment of the present invention. In the example of FIG. 4, an ante wagering area 402 may be provided for a player to place his or her ante wager and signify participation in the game. As illustrated in FIG. 4, additional wagers, such as a conventional tie wager may be provided with a wagering area on a table layout. The present invention may be applied to a baccarat game or baccarat-type game independent of whether additional wagers or propositions, such as a tie wager, are offered.

From this point forward, the optional methods described in FIGS. 1 and 2 may be substantially the same. Two hands are dealt 104. In an optional embodiment using baccarat terminology, the two hands may be designated a "player hand" and a "banker hand," although it is contemplated that any name or identification could be used to identify the hands. In conventional baccarat, a distinction between the player hand and banker hand are the draw rules applied to the hands, which leads to a commission typically charged on winning bets on the banker hand. It is noted that this conventional distinction may be preserved when applying the present method. Alternatively, the present invention may be applied to any baccarat or baccarat-type game, without regard to the specific draw rules, the inclusion or exclusion of a commission, or the like. In this regard, the present invention is an improvement or modification of the base game, regardless of the exact nature of the base game.

It is also noted that while the examples given below are directed to an embodiment in which two hands, a player hand and a banker hand, are wagered upon and conducted, any number of hands may be wagered upon and conducted in other optional embodiments. In an optional embodiment, a player may be presented with wagering options in addition to those specifically described in this disclosure, such as receiving an election to wager on a tie between hands or a pair appearing in a hand. Such optional or mandatory side wagers may be included in the base baccarat or baccarat-type game independent of the operation of the present method.

The hands may include any quantity of playing cards; in an optional embodiment, each hand is initially dealt two playing cards. It is contemplated that the hands may be community hands that are shared among players wagering on those hands in a manner similar to conventional baccarat. In an alternate optional embodiment, each player may receive a separate hand to wager on against a banker hand, similar to chemin de fer or other variations.

At least a portion of the playing cards among those dealt to the player hand and banker hand are revealed 106. It is contemplated that the playing cards revealed may be revealed in the player hand, banker hand, or a combination thereof. It is also contemplated that the playing cards revealed may constitute the entire initial player hand, a portion of the initial player hand, the entire initial banker hand, a portion of the initial banker hand, or any combination thereof.

A mandatory designation wager is received 108 after revealing at least a portion of the playing cards among those dealt to the player hand and banker hand. As discussed in further detail below, where the baccarat game or baccarat-type game includes draw rules, the drawn cards may be revealed prior to receipt of a designation wager or after. That is, in the optional embodiments illustrated in FIGS. 1 and 2, a designation wager is received 108 before completing 112 either hand according to the draw rules of the baccarat game or baccarat-type game. It is contemplated, however, that the designation wager may be received after dealing and/or revealing any draw cards for the banker hand, player hand, or both.

Along with the designation wager, a designation is received 110 of a hand for resolution of the designation wager and any game wager. That is, after at least a portion of the playing cards among those dealt to the player hand and banker hand are revealed, a designation wager is received and a designation is made whether to the designation wager (and any game wager) are "wagered" on the player hand or banker hand. Thus, until at least a portion of the playing cards among those dealt to the player hand and banker hand are revealed 106 and a designation is received 110, wagers are not affiliated with any hand. Thus, a designation is received 110 to tie wagers to a specific hand, only after a portion of the playing cards among those dealt to the player hand and banker hand are revealed. The mechanics of designating the player hand or banker hand may vary depending on the optional embodiment. In a live table game, for example, a table layout such as that illustrated in FIG. 4 may include a player hand wagering area 404 separate from a banker hand wagering area 406. The location where the designation wager is placed, i.e., whether the designation wager is placed in a player hand wagering area 404 or a banker hand wagering area 406, may act as the designation. In an electronic embodiment, discussed in greater detail below, a player interface may receive input of a designation through a button panel, touch screen, or the like.

Referring to the examples of FIGS. 1 and 2, the player hand and banker hand are completed 112 according to the underlying baccarat game or baccarat-type game. In one such optional embodiment, a hand score is calculated for each initially dealt hand by taking the sum modulo ten of the values of the playing cards in the hand. In an optional embodiment using conventional playing cards, the two through nine playing cards have a value equal to their face value, the Ace playing card has a value of one, and the ten, Jack, Queen, and King playing cards have a value of zero. As may be appreciated, the sum modulo ten means that if the sum exceeds ten, only the ones digit is used, with the tens digit disregarded. For example, the hand score for a hand of 8♢ 5♡ is three (e.g., thirteen modulo ten equals three). In such an optional embodiment, the target value, i.e., the goal in forming a hand, is a hand score of nine.

In an optional embodiment based on baccarat or baccarat-type game, draw rules may be applied and a game outcome is determined. For example, in an optional embodiment, one or more natural hand scores may be defined. There may be any quantity of natural hand scores and the natural hand scores may take any value. In such an optional embodiment, a natural hand score occurs when a predefined sum modulo ten is obtained in the initial cards dealt to a hand. For example, in one optional embodiment, eight and nine are defined as natural hand scores. In such an optional embodiment, a hand of, for example, 4♤ 5♡ (hand score of 9), 9♧ 9♡ (hand score of eight), 8♢ K♧ (hand score of eight), 9♤ J♤ (hand score of nine), and 8♡ A♢ (hand score of nine), would all have natural hand scores.

If a hand has a natural hand score, the hand always stands. Draw rules are defined for the hands that do not include natural hand scores. In an optional embodiment based on conventional baccarat, conventional draw rules may be used. In conventional baccarat, the player hand draws if the initial two-card player hand has a hand score of 0, 1, 2, 3, 4, or 5.

Conversely, the player hand stands, and does not draw, if the initial two-card player hand has a hand score of 6 or 7. If the player hand stands and does not draw a third card, then the banker hand draws on hand scores of 0, 1, 2, 3, 4, or 5, and stands on hand scores of 6, or 7. Conversely, if the player hand draws, the banker hand draws based on the initial two-card point value of the banker hand and the third card of the player hand, i.e., the value of the card drawn to the player hand. Table 1 summarizes the draw rules when the player hand draws.

TABLE 1

| Banker hand two-card hand score: | Banker hand DRAWS when Player's hand third card is: | Banker hand STANDS when Player's hand third card is: |
|---|---|---|
| 0, 1, or 2 | Bank always draws | |
| 3 | 0, 1, 2, 3, 4, 5, 6, 7, or 9 | 8 |
| 4 | 2, 3, 4, 5, 6, or 7 | 0, 1, 8, or 9 |
| 5 | 4, 5, 6, or 7 | 0, 1, 2, 3, 8, or 9 |
| 6 | 6 or 7 | 0, 1, 2, 3, 4, 5, 8, or 9 |
| 7 | | Banker always stands |

In an optional embodiment of an underlying baccarat or baccarat-type game, the hands are examined for natural hand scores. If only one of the hands obtains a natural hand score, that hand wins. For example, if a player hand is dealt 8♧ K♡ and a banker hand is dealt 5◇ 9♤, the player hand of 8♧ K♡ wins with a natural hand score of eight.

In an optional embodiment of an underlying baccarat or baccarat-type game, if more than one hand obtains a natural hand score, but the natural hand scores are unequal, the natural hand scores may be ranked so that the hands can be differentiated. Thus, in one such optional embodiment, a rule may be adopted in which the hand with the greater natural hand score wins. In one optional embodiment, the natural hand scores are ranked according to their proximity to the target value. Thus, in an optional embodiment in which nine is the target value, a natural hand score of nine may be ranked higher than a natural hand score of eight. For example, if a player hand is dealt 8♧ K♡ and a banker hand is dealt 5◇ 4♤, both hands have a natural hand score, but the banker hand of 5◇ 4♤ wins with a natural hand score of nine against the player hand's natural hand score of eight. In an example where the natural hand score of nine outranks the natural hand score of eight, the hand with a natural hand score of nine wins. As may be appreciated, this is merely an example and the natural hand scores may be ranked in any order. Optionally, if more than one hand has a natural hand score and the natural hand scores are equal, a tie may occur.

If neither hand has a natural hand score, the draw rules are applied and the hand scores are compared. If the hand scores of the player hand and banker hand are equal, a tie occurs.

If the hand scores are unequal, the hand scores are compared and the hand having a hand score closer to the target value is deemed the winning hand. In an optional embodiment using a target value of nine in which hand sums are calculated using modulo-ten arithmetic, such as conventional baccarat, the greater hand score will be closer to the target value than the lesser hand score.

After hands are completed and a game outcome has been determined, e.g., player hand winning outcome, banker hand winning outcome, or tie, the wagers are resolved 114. Wagers may be resolved in any manner. In an optional embodiment, designation wagers on the winning hand, that is, the hand with a hand score closer to the target value, are rewarded at even money without a commission. In an alternate optional embodiment, rewards may be assessed a commission. In one optional embodiment, the commission amount is a fixed amount, optionally expressed as a percentage of the reward. For example, in one such optional embodiment, a commission of 5% may be assessed on all rewards for designation wagers on a winning banker hand (or a winning player hand, or both, depending on the optional embodiment). In a game including a game wager, such as that illustrated in FIGS. 1 and 4, the game wager (also referred to as an ante wager) may be returned if the designated hand is the winning hand. Stated another way, if the designated hand is the winning hand, the game wager (e.g., ante wager) is returned and the designation wager (e.g., banker hand wager or player hand wager) is rewarded. In another optional embodiment, the game wager and designation wager may be rewarded if the designated hand is the winning hand. In either case, both the game wager and designation wager may be collected if the designated hand is not the winning hand.

Ties may be handled in a variety of ways, depending on the optional embodiment. In one optional embodiment, ties may always result in collection of the designation wager and any game wager. That is, in an optional embodiment, a tie results in collection of all designation wagers and game wagers, regardless of which hand was designated. In another optional embodiment, one of the wagers may be collected and the other wager may be returned (e.g., push) in the event of a tie. In yet another optional embodiment, both of the wagers may be returned (e.g., push) in the event of a tie. In yet other optional embodiments, the resolution of wagers in the event of a tie may depend on the designation. For example, in an optional embodiment, ties may be resolved in favor of the banker hand. In such an optional embodiment, game wagers, if any, and designation wagers designating the player hand would be collected while game wagers, if any, and designation wagers designating the banker hand may be returned, rewarded, or a combination thereof. Alternatively, tie outcomes could be resolved in favor of the player hand, with game wagers, if any, and designation wagers designating the banker hand collected while game wagers, if any, and designation wagers designating the banker hand returned, rewarded, or a combination thereof. It is contemplated that any other type of resolution of the game wagers, if any, and designation wager may be conducted and that the present method could be applied to any baccarat or baccarat-type game, regardless of the method of paying winning bets, including the various no-commission baccarat games known in the art.

As noted above, other wagers, such as tie wagers, proposition wagers, side wagers, bonus wagers, or the like may be offered. In such optional embodiments, these additional wagers may be resolved independent of the game wagers, if any, and designation wagers of the present invention.

In an optional embodiment, the present method may be conducted using a device. The device may take any form, including a personal computer, tablet, mobile phone, handheld device, PDA, electronic gaming machine, electronic gaming table, mechanical gaming machine, kiosk, or the like. In one such optional embodiment illustrated in FIG. 3, a device includes a data processor 302 in communication with a player interface 304 and a display 306. The data processor 302 also communicates with a data storage device 308, which stores game parameters, graphics, sounds, if any, and program instructions executable by the data processor 302 to conduct a game according to an embodiment of the present invention.

For example, in one optional embodiment, a game wager is received from the player through a player interface 304. The player interface 304, for example, may include an input device, such as a touch screen, button panel, keyboard, keypad, pointer, mouse, or the like, that the player can operate to designate a wager. Additionally or alternatively, the player interface 304 may include a receiving device, such as a bill acceptor, ticket or voucher reader, coin receiver, or the like to receive payment for a wager and/or game credits usable for wagering. A game wager, optionally referred to as an ante wager, may be received through a player interface 304 prior to dealing or displaying any hands or cards. As above, a game wager is unaffiliated with any hand and, thus, merely acts to initiate a game and indicate the player's eligibility in the game. Optionally, additional proposition wagers, side wagers, bonus wagers, or the like may be selectable by the player, such as a wager on a tie outcome, a pair occurring in one or both of the hands, or other optional proposition.

The data processor 302 deals a player hand and a banker hand, optionally by randomly dealing cards from a deck (or multiple decks) stored at the data storage device 308. The data processor 302 displays at a display 306 a portion of the playing cards among those dealt to the player hand and banker hand. As above, the displayed playing cards may include a portion, or all, of the player hand, a portion, or all, of the banker hand, or a combination thereof.

A designation wager and a designation of a hand for resolution of the designation wager and game wager are received through the player interface 304. It is contemplated that the input of the wager and the designation of a hand may be two separate inputs or may constitute a single input. For example, a player interface 304 may include buttons or touch screen fields that read "Player Hand" and "Banker Hand," and input from one of the buttons serves to designate the selected hand and place a designation wager of a predetermined amount. For example, in an optional embodiment, a designation wager may be required to match the value of a game wager, e.g., ante wager.

The data processor 302 completes the hands according to the method described above. For example, in an optional embodiment, the hand score of each hand is calculated by the data processor 302. If either hand has a natural hand score, the game ends with the hand having the natural hand score closer to the target value winning.

If neither hand has a natural hand score the draw rules are applied and the hands are completed. The hand scores of the banker hand and player hand are calculated and compared to determine a winning hand. In an optional embodiment, designation wagers are rewarded and game wagers, if any, are returned when the designated hand is the winning hand. As noted above, payouts for designation wagers may be even money and a commission may, or may not, be assessed depending on the optional embodiment. In one optional embodiment, game wagers, if any, and designation wagers are collected when the designation hand is not a winning hand. As discussed above, ties may be handled in any manner. In one such optional embodiment, game wagers, if any, and designation wagers are collected when a tie occurs. In alternate optional embodiments, the game wager, designation wager, or both may be returned when a tie occurs.

Awards for winning game wagers and bonus wagers may be added to a register of game credits stored in the device. Additionally or alternatively, the player interface 304 may include a dispensing device to dispense currency, coins, a ticket or voucher, or the like, representing the player's balance of stored game credits when the player desires to cash out.

While certain embodiments of the present invention have been shown and described it is to be understood that the present invention is subject to many modifications and changes without departing from the spirit and scope of the invention presented herein.

I claim:

1. A method of conducting a Baccarat card game on a gaming device with a data processor in communication with a display, a player interface comprising at least one player input device and at least one wager receiving device configured to accept a physical item representing a monetary value to increase a credit balance of game credits usable for wagering, and a memory device configured to store program instructions that are executable by the data processor, the method comprising:

storing a set of Baccarat draw rules on said memory device;

receiving a physical item associated with a monetary value at the wager receiving device of the gaming device to increase the credit balance stored on the gaming device;

receiving an ante wager through said player interface from the credit balance without receiving a designation of whether said ante wager is to be resolved based on a banker hand or a player hand;

dealing, by said data processor, playing cards to said banker hand and said player hand, each of said playing cards having a designated value;

displaying the playing cards of only one of the banker hand and the player hand face up at the display;

receiving through said player interface a mandatory wager after said step of displaying the playing cards of only one of the banker hand and the player hand face up at said display, the mandatory wager including a designation of either said player hand or said banker hand for resolution of the mandatory wager and the ante wager;

revealing at the display a remaining hand of the banker hand and the player hand face up after receiving the mandatory wager;

calculating by said data processor a hand score for each of said banker hand and said player hand as the sum modulo ten of the values of the playing cards in said banker hand and said player hand;

comparing by said data processor the hand scores of said banker hand and said player hand to a target value and standing or dealing additional playing cards to said banker hand and said player hand according to said Baccarat draw rules;

recalculating the hand scores of said banker hand and said player hand including any additional playing cards dealt and comparing the recalculated hand score of said player hand to the recalculated hand score of said banker hand and said target value by said data processor; and resolving by said data processor the mandatory wager by paying out the mandatory wager if the designation is placed on the player hand or the banker hand that has the recalculated hand score closer to said target value, and updating the credit balance via a payout device for the player at the gaming machine.

2. The method of claim 1, wherein the resolving step comprises returning the ante wager if the designation is placed on the banker hand or the player hand that has the recalculated hand score closer to said target value.

3. The method of claim 1 wherein the resolving step comprises collecting said ante wager and said mandatory wager if the mandatory wager is placed on the banker hand or the player hand that has the recalculated hand score that is further from said target value.

4. The method of claim 1, wherein the resolving step comprises collecting said ante wager and said mandatory wager when said hand score of said player hand and said banker hand are equal.

5. The method of claim 1, wherein said step of displaying the playing cards of only one of the banker hand and the player hand face up comprises displaying at said display the playing cards of said player hand face up while leaving the playing cards of said banker hand unrevealed.

6. The method of claim 1, wherein said step of displaying the playing cards of only one of the banker hand and the player hand face up comprises displaying at said display the playing cards of said banker hand face up while leaving the playing cards of said player hand unrevealed.

7. The method of claim 1, further comprising receiving a tie wager that is awarded when the hand score of the banker hand and the player hand are equal.

8. A method of conducting a Baccarat card game on a gaming device with a data processor in communication with a display, a player interface comprising at least one player input device and at least one wager receiving device configured to accept a physical item representing a monetary value to increase a credit balance of game credits usable for wagering, and a memory device configured to store program instructions that are executable on the data processor, the method comprising:

storing a set of Baccarat draw rules on said memory device;

receiving a physical item associated with a monetary value at the wager receiving device of the gaming device to increase the credit balance stored on the gaming device;

receiving an ante wager through said wager receiving device of said player interface without receiving a designation of a game outcome upon which the ante wager will be resolved;

dealing, by said data processor, playing cards to a banker hand and a player hand, each of said playing cards having a designated value;

displaying the playing cards dealt to said player hand face up and displaying the playing cards dealt to said banker hand face down at said display;

receiving through said player interface a mandatory wager after said step of displaying the playing cards dealt to said player hand face up at said display, the mandatory wager including a designation of either said player hand or said banker hand for resolution of the mandatory wager and the ante wager;

calculating by said data processor a hand score for each of said banker hand and said player hand;

comparing by said data processor of the hand scores of said banker hand and said player hand to a target value and standing or dealing additional playing cards to said banker hand and said player hand according to said Baccarat draw rules;

recalculating hand scores of said banker hand and said player hand by including any additional playing cards dealt to the banker hand or the player hand and comparing the recalculated hand score of said player hand to the recalculated hand score of said banker hand and said target value by said data processor; and resolving by said data processor the mandatory wager by paying out the mandatory wager if the designation is placed on the player hand or the banker hand that has the recalculated hand score closer to said target value, and updating the credit balance via a payout device for the player at the gaming machine.

9. The method of claim 8, wherein the resolving step comprises returning the ante wager if the designation is placed on the banker hand or the player hand that has a recalculated hand score closer to said target value.

10. The method of claim 8, wherein the resolving step comprises collecting the ante wager and mandatory wager if the designation is placed on the banker hand or the player hand that has a recalculated hand score further from said target value.

11. The method of claim 8, wherein the resolving step comprises collecting said ante wager and mandatory wager when said hand score of said player hand and said banker hand are equal.

12. The method of claim 8, further comprising receiving a tie wager that is awarded when the hand score of the banker hand and the player hand are equal.

* * * * *